United States Patent [19]

Dolby

[11] 4,355,383

[45] Oct. 19, 1982

[54] APPARATUS FOR SCANNING VARIABLE AREA OPTICAL SOUND TRACKS BY PARALLEL PROCESSING DISCRETE PHOTOSENSOR OUTPUTS

[75] Inventor: Ray M. Dolby, San Francisco, Calif.

[73] Assignee: Dolby Laboratories Licensing Corporation, San Francisco, Calif.

[21] Appl. No.: 154,074

[22] Filed: May 28, 1980

Related U.S. Application Data

[63] Continuation of Ser. No. 803,042, Jun. 3, 1977, abandoned.

[51] Int. Cl.³ .......................... G11B 7/00; G11B 7/12
[52] U.S. Cl. ..................................... 369/120; 369/124; 369/125
[58] Field of Search ................. 179/100.3 R, 100.3 A, 179/100.3 B, 100.3 V, 100.3 E, 100.3 Z; 358/7, 127, 128.5–128.6, 130–132, 102, 212–213; 369/100, 111, 120, 124, 125

[56] References Cited

U.S. PATENT DOCUMENTS

| 1,921,483 | 8/1933 | Rouse | 179/100.3 R |
| 2,871,755 | 2/1959 | Pierre | 179/100.3 R |
| 3,848,095 | 11/1974 | Wohlmut et al. | 179/100.3 B |
| 3,949,161 | 4/1976 | Fujishima et al. | 358/132 |
| 4,124,784 | 11/1978 | Johnson et al. | 179/100.3 R |

FOREIGN PATENT DOCUMENTS

390142 of 1938 United Kingdom .
1120574 7/1968 United Kingdom ................ 358/213

OTHER PUBLICATIONS

Bankowski et al., "CCD Scanner Having Simultaneous Readout, etc.", IBM Tech. Disc. Bulletin, vol. 16, No. 1, 7/73, pp. 173–174.
Reticon C Series Solid State Linear Scanners, Product Brochure of Reticon Corp. of Sunnyvale, Calif., Copyright 1976.

Primary Examiner—Raymond F. Cardillo, Jr.
Attorney, Agent, or Firm—Majestic, Gallagher, Parsons & Siebert

[57] ABSTRACT

Apparatus for scanning variable area optical sound tracks wherein a plurality of discrete photo sensors examine small fractional portions of the sound track width. Selection of the number of sensors in relation to photographic grain dimensions results in converting annoying quantizing noise to more tolerable random noise while using a practical number of sensors. Electronic processing of the sensors' outputs reduces impulse noise from dirt and scratches.

4 Claims, 5 Drawing Figures

APPARATUS FOR SCANNING VARIABLE AREA OPTICAL SOUND TRACKS BY PARALLEL PROCESSING DISCRETE PHOTOSENSOR OUTPUTS

This is a continuation of application Ser. No. 803,042, filed June 3, 1977, and now abandoned.

BACKGROUND OF THE INVENTION

The invention relates generally to playback equipment for variable area optical soundtracks and more particularly to an improved apparatus for scanning such sound tracks.

Variable area optical sound tracks on motion picture film have been used in substantially their present form since the earliest days of sound-on-film in the cinema. In their earliest form, a single monophonic optical sound track was used, the width of the clear area being proportional to the recorded modulation amplitude. Later modifications intended to reduce distortion provided for bilateral and dual bilateral tracks adjacent to each other, carrying the same modulation information and being identical in their pattern. A further modification provides for separately modulating the dual bilateral tracks to provide stereophonic reproduction.

Modern commercial film projectors continue to use essentially the same illumination and light sensing arrangements for reading variable area optical sound tracks as those that were used in the earliest sound projection equipment: a light source and narrow mechanical slit to provide a line source illumination, with a single photocell for detection or with dual photocells in the case of stereophonic dual bilateral tracks.

A continuing problem in optical sound track reproduction is the suppression of noise while seeking to provide wide frequency range. Optical sound tracks are particularly susceptible to impulse noise caused by dirt and scratches, which increase with the number of times a print is projected. Other types of noise include grain noise in the white (clear) area of the track and photoelectric cell noise, both of which are essentially proportional to the width of the track being replayed and cause a noise modulation effect when the signal is reproduced.

Various techniques have been introduced to improve the quality of optical sound tracks and indications are that the medium is not inherently as deficient as had been supposed in the 1950's and 1960's, when attempts were made to popularize magnetic sound tracks. A useful discussion of the history and potential of optical sound tracks includes "The Production of Wide-Range, Low-Distortion Optical Sound Tracks Utilizing the Dolby Noise Reduction System," by Ioan Allen in the *Journal of the SMPTE*, September, 1975, Volume 84, pages 720–729. The paper includes a bibliography in the subject area.

An early attempt at a different approach in replaying the optical sound track is set forth in U.S. Pat. No. 2,347,084 in which the track is repeatedly scanned across its width by a very small scanning spot and detected by a single photo responsive cell to produce an essentially two-level pulse width modulated signal. The signal is limited to suppress noise and is integrated to provide an amplitude varying audio signal. This system is useful in eliminating a substantial amount of noise which is caused by dark spots on the clear area of the track, the black areas being substantially noise-free, except where the negative may have had imperfections, causing white spots. However, in spite of the scanning technique some dark spots on the clear area will still produce noise.

An improved scanning system is described in British patent application No. 37292, filed Aug. 27, 1974 by the present inventor. Said British application corresponds to U.S. application Ser. No. 603,671, filed Aug. 11, 1975 now abandoned which is the parent of continuation-in-part U.S. application Ser. No. 778,870, filed Mar. 18, 1977 and now U.S. Pat. No. 4,223,188. In that system the knowledge that the noise arises primarily in the clear area is taken advantage of by squelching the output signal after initial detection of the black to white transition on the film track during each scan. The reset is effected after each scan. Further refinement of the technique employs a two-way scan so that the white to black transition on a dual bilateral track can be utilized. Signal delays and logic circuits are also employed for this purpose.

In both prior scanning systems described, a problem is in the complexity of the optical scanning mechanisms which would require extensive modification to existing film projectors. Also, long term reliability and relative immunity from frequent adjustments are essential in commercial projection equipment. The prior art scanning systems are susceptible to such problems because of their use of cathode ray tube, mechanical, laser, or other electro-optical scanning techniques.

SUMMARY OF THE INVENTION

In accordance with the teachings of the present invention an improved optical sound track playback system is provided which retains the advantages of optical scanning and yet is essentially electronic in character. The method permits uniquely tailored processing techniques to be employed in order to reduce the particular types of noise afflicting optical sound tracks.

The development of the invention is as follows. First, the need for scanning of the track with a light beam would apparently be eliminated if a photosensor array could be arranged to sense the changing width of the optical track. Optical enlargement of the track could be employed but to make the system practical for use with existing projectors, the sensor array should preferably be situated immediately behind the film plane. However, a deterrent in employing a sensor array technique is the knowledge that quantizing noise would be a problem. In the audio art it is conventionally accepted that to quantize an audio signal with high quality requires something in the order of 10,000 or more quantizing steps. Since the total track width of a single stereo optical track on 35 mm film is 0.033 inches, or about 0.016 inches for each of the bilateral recordings, a photosensor array of 10,000 elements spaced at 1.6 microinch intervals is indicated. This is out of the question in the current state of microelectronic art; even with the use of an optical magnification system, which would greatly increase installation difficulties with existing projectors, an array of 40,000 sensors for the whole track width would be a formidable undertaking.

Further study of the matter leads to a more hopeful result. In quantizing audio signals it is known to add a wideband dither signal to the input signal in order to reduce correlation between the signal and the quantizing noise. This reduces the annoyance of the quantizing noise significantly. If the dither signal is large enough then a smaller number of digitizing steps suffices. Microscopic inspection of variable area optical sound tracks shows that the clear to black boundary of the track is not an abrupt one but rather has a ragged edge due to the uncertainty introduced by film grain. This uncertainty extends over a distance of 0.0001"-0.0002". If this uncertainty is regarded as a dither signal, added to the input signal, then the sound track could be quantized in steps of, say, 0.0001". Thus each half of each bilateral recording could be quantized into only 160 steps, a very low number compared with the 10,000 conventionally required in quantizing an audio signal.

A photosensor array with a pitch of 0.0001" represents a packing density about ten times closer than in current micro-electronic practice. While new masking and etching techniques, such as electron beam photolithography may be required, this increase in density is not out of the question. In any case, optical magnification can be used until such time that the necessary microelectronic production techniques are available. Thus an important element of the invention is the discovery and recognition that optical sound tracks have an inherent property which makes a quantized reproduction system feasible.

Another element of the invention is the recognition that with a digital readout system lateral scanning of the sound track is unnecessary, thereby avoiding the considerable complication of clock circuits, switching, and pulse width demodulation. In accordance with this aspect of the invention the output of each photosensor element is processed in parallel. Each sensor output is directly fed to its own amplifier and limiter circuit; most of the spurious outputs due to dirt and scratches are eliminated by the limiting action. Logic can then be applied to the circuit outputs in order to achieve further noise reduction. The outputs of all the circuits are then combined and smoothed to form the audio output signal. The circuitry required in these steps is all very simple, permitting the incorporation on a single integrated circuit chip of all photosensor elements, amplifier/limiters, noise suppression logic, combining circuitry, and audio signal output amplifiers. In accordance with the figures mentioned previously, 640 sensing and processing channels would be involved; in most commercial motion picture applications the final output of the integrated circuit would, however, comprise only the two audio channels.

The invention is applicable to all types of variable width optical sound tracks including monophonic bilateral, monophonic dual bilateral and stereophonic dual bilateral by selecting the portion of photodiodes to be processed as a separate group. Two, three, four or more tracks and processing chains can be used to provide signals for left, center, right, rear, surround effects, control signals for special purposes, and the like.

Since the inventive system uses the conventional illuminating source in a projector, the only modification to the projector mechanical structure required is to substitute the photodiode and processing IC for the photoelectric cell. Optional optics may be possible or desirable in some instances to effectively place the photodiode strip at the film track image plane.

These and other advantages and features of the present invention will be appreciated as the following description of the preferred embodiments is read in conjunction with the drawings.

DESCRIPTION OF THE PREFERRED EMBODIMENTS

Figure 1:
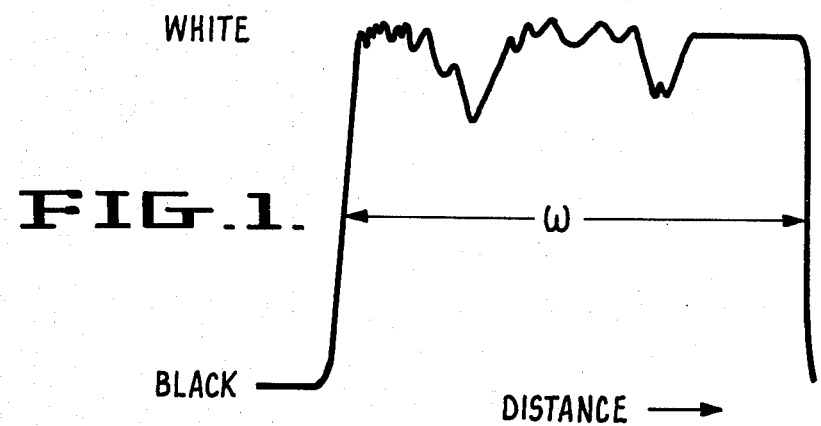
FIG. 1 is a plot of density versus distance of an exemplary variable area optical sound track scan useful in understanding the present invention.
Figure 2:
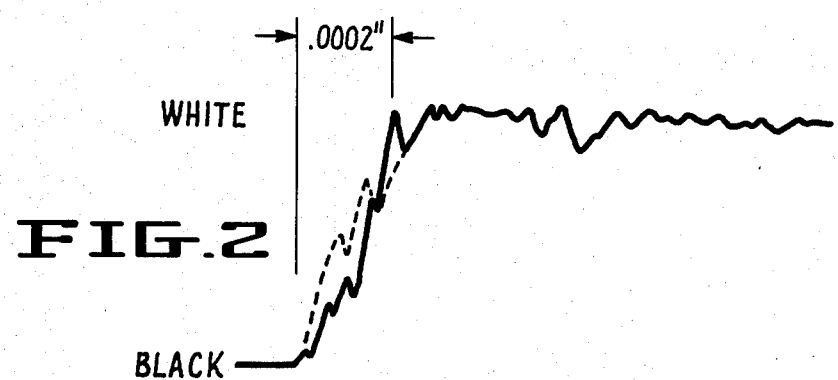
FIG. 2 is a magnified plot of the black to white transition portion of FIG. 1.

Referring now to FIG. 1, the photographic density versus distance of an exemplary scan across a single bilateral variable area sound track is shown. In scanning systems the waveform information is in the pulse width w. The initial black level is essentially a constant level and is therefore noise free. However, the white level varies substantially in amplitude due to dark particles typically encountered in the white area. Without limiting to remove such variations the resulting reproduced audio signal would contain substantial noise. However, limiting does not remove all amplitude variations, nor does it affect the noise generated by the uncertainty in the black/white (and white/black) transitions as depicted in FIG. 2. FIG. 2 has a magnified scale in order to show the manner in which the signal builds up in the transition area. The dotted lines show another possible amplitude build up. Thus, depending on the level of limiting, the apparent position of the black to white transition will vary, which creates hiss in the reproduced signal.

Figure 3:
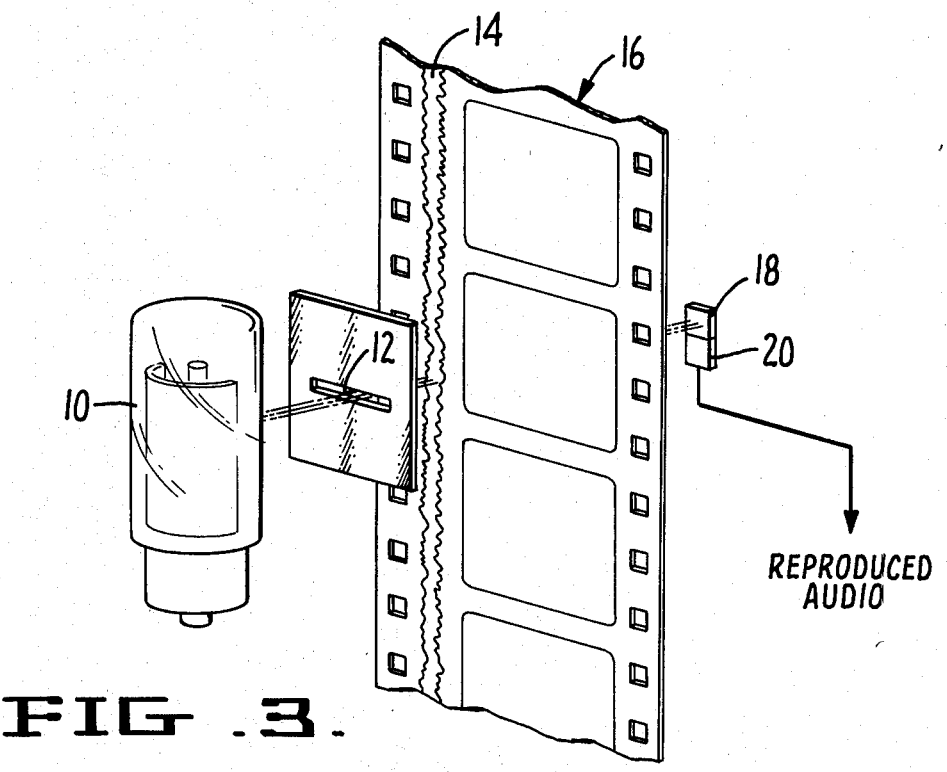
FIG. 3 is a partially block schematic perspective view of an optical playback system embodying the present invention.

In FIG. 3 the general arrangement of the present system is shown, including a conventional lamp 10 and mechanical slit 12 for horizontally illuminating a narrow strip of the variable area sound track 14 of a motion picture film 16. Although a bilateral sound track is shown, the invention is also applicable to multiple track films. The light modulated by sound track 14 is sensed by photoreceptor means comprising an array of solid state sensors 18 that sense, respectively, small fractional portions of the sound track width. As necessary, various lenses may be provided among lamp 10, slit 12, film 16 and sensors 18 in order to optically place the slit image and sensors at the film plane. Processing circuitry 20 receives the sensors 18 outputs and generates the reproduced audio therefrom. The invention has as one of its purposes to yield a system in which both the sensors and the processing circuitry may be contained on a single integrated circuit chip.

The number of sensors is chosen to provide about one sample per 0.0001 inches across the sound track, or about 640 sensors for the active areas of a 0.076 inch standard track. This number of sensors is sufficiently large to avoid quantizing noise yet not so large as to sample excessively over the areas of uncertainty. About two or three samples are taken over each area of uncertainty thus providing a random sampling and substituting random noise, which is psychoacoustically acceptable, for annoying quantizing noise.

Figure 4:
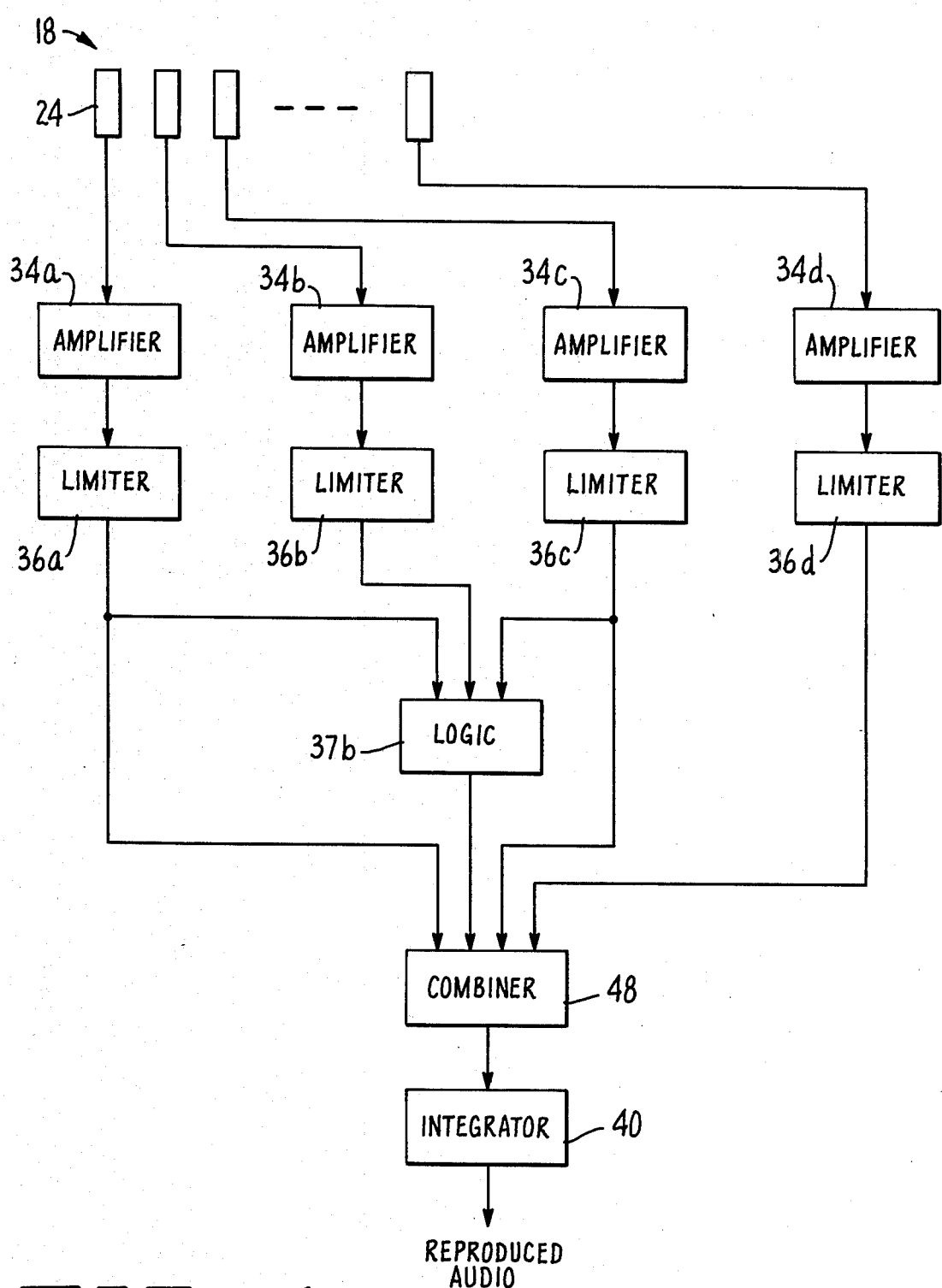
FIG. 4 is a functional block diagram of the sensor array and processing circuitry of the preferred embodiment of the invention.

In the preferred embodiment shown in FIG. 4 the sensors 24 of array 18 are each connected to their own amplifiers 34a, 34b, etc. and limiters 36a, 36b, etc. and the limiters' outputs are applied to a combiner 48. In its simplest form, combiner 48 sums the applied signals and applies the result to the integrator 40 to provide the reproduced audio signal.

If sensors 24 are arranged in other than an evenly spaced manner, as by a greater density in the center of the track area, the resulting signals can be appropriately weighted in the combiner to compensate.

In the case of multiple sound tracks, such as stereo bilateral tracks, the sensors 24 of FIG. 4 may be divided into groups depending on which reads each particular track and the groups are applied to separate processing chains to provide a separate reproduced audio signal for each track. The groups would then be applied to separate combiners.

While most of the dirt and scratch noise reduction action is provided by the action of limiters 36, it is possible to employ logic circuits in each of the limiter outputs to achieve further noise reduction, shown by way of example as logic 37b receiving the limiter 36b in FIG. 4. Similar logic circuits (not shown) can be provided in the outputs of the other limiters 37a, 37c, etc. Scratch noise manifests itself by non-uniformity of the outputs of the limiters. For example, in the clear area of the track, the limiter outputs might all be positive in polarity. A deep scratch might cause one (or a small number of) limiter outputs to become negative in polarity. By comparing the polarity of the output of a given limiter (say 36b) with that of reference limiters on either side (say 36a and 36c, or perhaps removed by two or more elements), then the presence of an anomalous signal can be detected. If a polarity difference is detected between a particular limiter and its reference limiters then that limiter output is cancelled and the polarity of the reference limiters is substituted.

Figure 5:
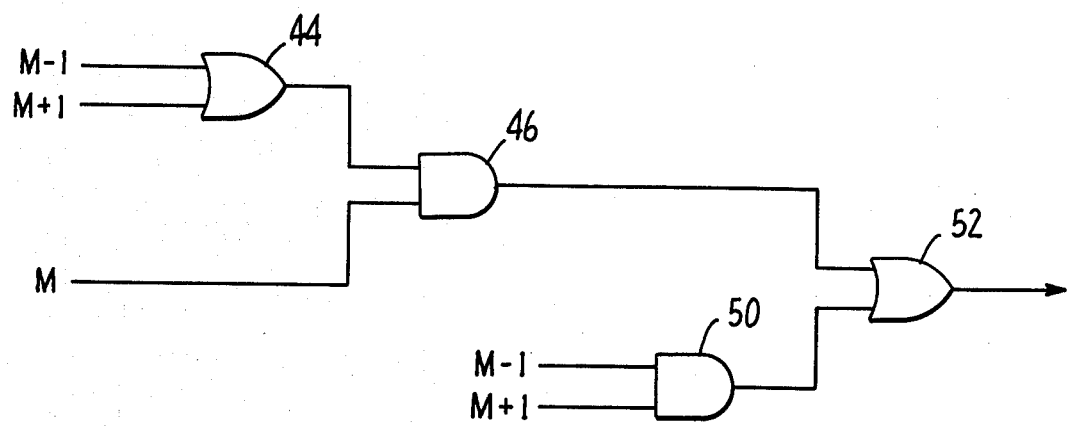
FIG. 5 is a schematic diagram of a portion of the logic circuit usable in FIG. 4.

One possible logic circuit to determine if the limiter output is spurious is represented by the combination of an OR-gate 44, AND-gate 46, AND-gate 50 and OR-gate 52 as in FIG. 5 in which the output m is compared with the outputs say one sensor removed on either side. If it is the same, the signal is considered valid; if there is a difference, then the polarity of the reference sensors is provided at the output. The logic circuit could be simplified by omitting elements 50 and 52, in which case an anomalous white signal in the black area is not changed to a black signal.

As a practical matter, the amplifiers 34, limiters 36, and logic 37 can be combined in a single electronic circuit, with suitable cross couplings between the circuits to provide the logic inputs.

The embodiment of FIG. 4 may also be useful in applications other than types of scanning systems where an analog output signal is required. For example, in systems scanning a workpiece to measure thickness, width, hole size or the like.

I claim:

1. A scanning system for reproducing a variable area optical sound track comprising means for illuminating a substantial width of the sound track, a linear array of photoreceptor means disposed relative to the sound track from said illuminating means for generating analog electrical signals in response to the level of illumination received at each of said photoreceptor means from a respective small fractional portion of the sound track, means for simultaneously processing in parallel said electrical signals, and including means for limiting each of said electrical signals, and means receiving in parallel said simultaneously processed electrical signals for simultaneously combining said processed electrical signals to generate an audio signal.

2. The combination of claim 1 wherein the number of photoreceptor means is in the order of one for every 0.0001 inches of optical sound track width, whereby the uncertainty of the black boundary transitions in the optical sound track provides a wideband dither signal to reduce the correlation between the signal and the quantizing noise.

3. The combination of claim 1 wherein said means for simultaneously processing in parallel further includes logic means responsive to the limited signals for determining the validity of each signal and for making an interpolated substitution in the case of invalidity.

4. The combination of claim 3 wherein the number of photo-receptor means is in the order of one for every 0.0001 inches of optical sound track width, whereby the uncertainty of the black boundary transitions in the optical sound track provides a wideband dither signal to reduce the correlation between the signal and the quantizing noise.

* * * * *